March 6, 1962     E. M. GEBLER     3,023,999
AUTOMOBILE JACK
Filed May 11, 1959
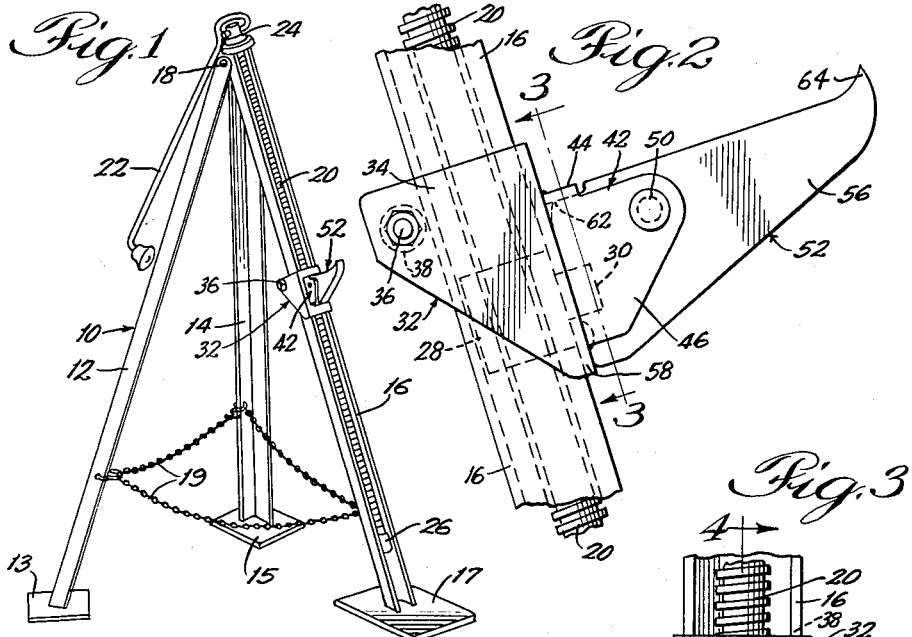
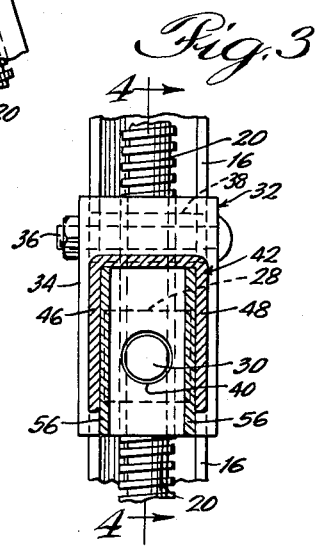
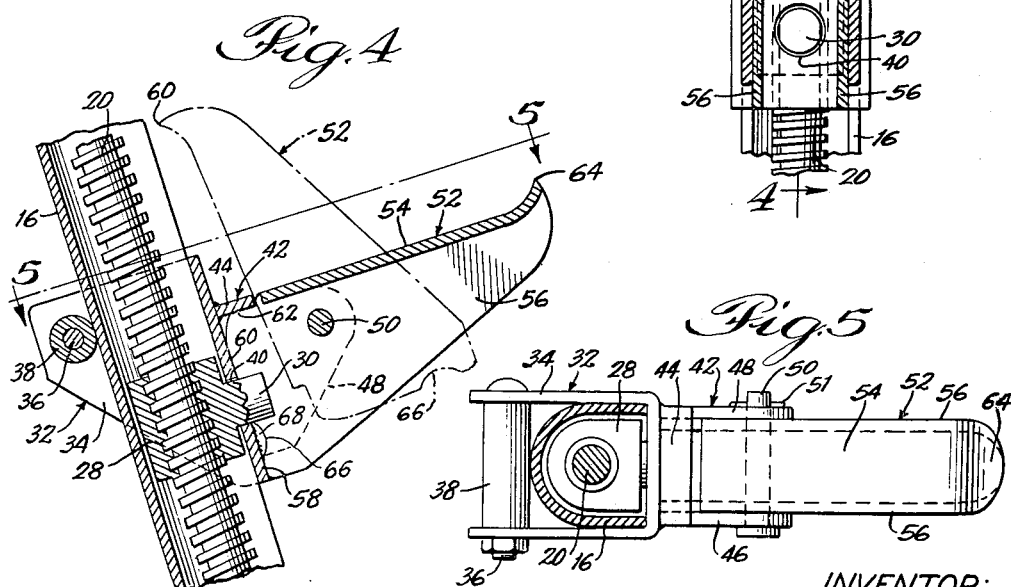
INVENTOR:
Elton M. Gebler,
BY Bair, Freeman & Molinare
ATTORNEYS.

United States Patent Office 3,023,999
Patented Mar. 6, 1962

3,023,999
AUTOMOBILE JACK
Elton M. Gebler, Winona, Minn., assignor to Vulcan Manufacturing Co., Inc., Winona, Minn., a corporation of Minnesota
Filed May 11, 1959, Ser. No. 812,350
2 Claims. (Cl. 254—99)

This invention relates to bumper jacks for automobiles and more particularly relates to a bumper jack having a pivotable bumper-engaging hook.

Screw-type bumper jacks of the type having a bumper-engaging hook connected to an elongated upright screw member for movement therealong are, of course, notoriously old. However, the recent construction of many automobiles has posed certain problems connected with this type of automobile jack. For example, some bumper-engaging hook members must extend a very substantial distance away from the screw member to which they connect and this makes the jack an undesirably bulky device both to pack for shipment and for storage in the trunk of a car.

Certain pivotable hooks have heretofore been proposed, but all such hooks have required use of spring members for locating the hook at an operative attitude when the jack is being used, and these features have increased the cost of such jacks, and the springs, by their failure, cause maintenance problems.

Thus, it is the object of this invention to provide a screw-type bumper jack having an improved bumper-engaging hook.

Another object of this invention is to provide a screw-type bumper jack having an improved pivotably mounted bumper-engaging hook which permits of packing the bumper jack in smaller containers and permits of more compact storage in the trunk of an automobile.

Still another object of this invention is to provide a bumper-engaging hook means for a screw-type bumper jack which may be readily substituted for existing bumper-engaging hook means which fail to cooperate properly with new car designs, thereby providing means for preventing unwarranted obsolescence of existing screw-type bumper jacks.

A further object of this invention is to provide a bumper-engaging hook means for a screw-type bumper jack which is characterized by its simplicity and inexpensiveness of construction and by its efficiency of operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a perspective view of a screw-type tripod bumper jack which is equipped with the improved bumper-engaging hook of this invention.

FIGURE 2 is an enlarged fragmentary side elevation view of the screw-carrying leg of the tripod jack, and showing in side elevation the bumper-engaging hook in operative position.

FIGURE 3 is a cross-section view taken on line 3—3 of FIGURE 2.

FIGURE 4 is a cross-section view taken on line 4—4 of FIGURE 3 and also shows in dot-dash lines the bumper-engaging hook when pivoted to an inoperative position.

FIGURE 5 is a view taken on line 5—5 of FIGURE 4.

Referring now to the drawings, there is shown in FIGURE 1 a tripod jack generally indicated at 10, which includes two angle-shaped legs 12 and 14, and a channel-shaped leg 16. The legs are provided respectively with ground-engaging support plates 13, 15 and 17 welded to the legs. The angle legs 12 and 14 are pivotally connected to the channel leg 16 on pivot pins 18, to permit of compact folding of the device, in a manner that is well known in the art. Chain means 19 connected to the legs are usually provided for restraining the spreading of the legs of the tripod relative to each other.

The channel leg 16 is provided with an elongated screw 20, the upper, or head, end of which is connected to a manually operable handle 22, and there being a bearing 24 below the head end for supporting the screw 20. The lower end of the screw 20 is appropriately restricted to lie within channel leg 16 by means of a loop 26 carried by the channel leg 16. Thus far, what has been described is structure well known in the art.

In order to provide a lifting means which is operated by the screw member 20, there is provided a bored and screw-threaded block 28 of an exterior shape closely conforming with the interior shape of channel leg 16, as can best be seen in FIGURE 5, and which block 28 is screw-connected to the elongated screw 20. The arrangement is such that, upon rotation of the screw 20, the block 28 is caused to slidably move along the inside of the channel leg 16. The block 28 has a finger, or stud, 30 extending therefrom outwardly of the channel leg 16.

There is provided a carriage generally indicated at 32 which is formed so that there are portions of said carriage which closely surround the outside of the channel leg 16 so as to restrict the carriage for only sliding movement along the channel leg 16. The carriage 32 is generally formed of a U-shaped frame 34, the legs of which are interconnected by a bolt 36 which carries thereon a spacer 38 which lies closely adjacent the rear edge of channel leg 16, so as to provide a close fit of carriage 32 on channel leg 16, and so as to permit of only sliding movement between the carriage 32 and the leg 16. The bight of U-shaped member 34 has an aperture 40 therein through which extends the stud 30 of block 28, thereby coupling the carriage 32 to the block 28.

The bight of the U-shaped member 34 has secured thereto, by welding, a generally inverted U-shaped bracket 42 whose bight is indicated at 44, and the legs of which are indicated at 46 and 48. The legs 46 and 48 extend outwardly a much further distance than does bight 44, for a reason that will appear hereinafter. The extended portions of legs 46 and 48 are appropriately apertured to receive therein an alloy steel pivot pin 50, which pin is retained in position by its head at one end and by a spring grip washer 51 at its other end.

Pivotally mounted on pin 50 is a generally inverted U-shaped hook member 52 whose bight is indicated at 54 and whose legs are indicated at 56. The hook 52 is pivotable between the position shown in full lines in FIGURE 2, and the position shown in dot-dash lines in FIGURE 4. When the hook 52 is in the position shown in full lines in FIGURES 2 and 4, the arrangement of parts is such that the bight 54 of hook 52 is edgewisely aligned with bight 44 so that said parts 54 and 44 appear to lie in the same plane and appear to be extensions of each other.

The edges of the legs 56 of hook 52 are so formed and shaped that when the hook 52 is in its full line position of FIGURES 2 and 4, the edges of said legs 56 engage the bight of U-shaped frame member 34 at the points 58 and 60 and also engage the underside of member 44 at 62. This arrangement provides for a very rigid engagement between hook member 52 and carriage 32, so that during the lifting operation there is provided the necessary strength for the lifting of a heavy object such as an automotive vehicle.

When not in use, the hook 52 may be swung to the dot-dash lines of FIGURE 4, thereby permitting of compact folding of the jack, for either storage within the trunk of an automobile, or for packing for shipment from a factory.

The hook 52 has the extended tip thereof hooked upwardly, as at 64, to define a lateral restraint. The edges of the legs 56 are slightly recessed, as seen at 66, to avoid the weld beads 68 that occur between the legs 46 and 48 and the carriage 32, and thereby permits of flush engagement of the remaining edge portion of the legs 56 with the bight of member 34 of the carriage 32.

The arrangement of parts is such that when the hook member 52 is swung to the position shown in dot-dash lines in FIGURE 4, then the bight 54 of hook member 52 engages the extended edge of member 44, so that the hook 52 assumes the said position shown in dot-dash lines in FIGURE 4.

The manufacture of hook member 52 is very simple by reason of its simple shape, and eliminates use of hook members of complex shape. The arrangement of parts eliminates the use of springs to maintain a hook member at a selected attitude, and gravity simply causes hook 52 to assume the attitude of FIGURE 2, ready for use. If necessary to replace the hook 52, it is very simple to remove the clevis pin 50 and replace the hook with use of only simple tools.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States is:

1. A bumper jack for automobiles comprising, in combination, an upright support, a carriage movable in opposite directions along said support, an inverted U-shaped mounting means on said carriage defining a pair of upright spaced mounting legs and a transverse planar abutment flange extending outwardly from said carriage and with ear portions of said mounting legs positioned below the abutment flange and extending further from said carriage than does said planar abutment flange, an inverted U-shaped hook member pivotally mounted on and between said ear portions of the legs of said mounting means, said hook member being pivotable relative to said U-shaped mounting means between an inoperative, folded, position and an operative position where the bight of said U-shaped hook member and the planar bight of said U-shaped mounting means are in edgewise aligned relationship in a single plane with edges of the legs of said U-shaped hook member abutting the carriage and the underside of said abutment flange, to provide a rigid weight-supporting connection between said hook member and said carriage, and the bight of the U-shaped hook member being positioned to engage the edge of said planar abutment flange when the hook member is pivoted to its inoperative position, and the bight of the U-shaped hook member being straight over substantially its entire length, but with the extended tip of the hook member formed to hook upwardly to define a lateral restraint.

2. A bumper-engaging hook means for use with a screw-type jack which includes an elongated channel-leg and an elongated screw positioned coaxially in said channel-leg; said hook means comprising, in combination, a bored and screw-threaded block for screw connection to said elongated screw and for sliding movement along the inside of said channel-leg in response to rotation of said elongated screw, and a transverse stud on said block for extending outwardly of said channel-leg, an upright carriage having portions thereof closely surrounding the outside of said channel-leg to restrict said carriage for sliding movement along said channel-leg, said carriage defining an aperture through which said transverse stud on said block extends so as to couple together said block and carriage, and hook-mounting means including an inverted U-shaped bracket connected along the U-shaped periphery thereof to said carriage below the upper edge of said carriage, the bight of said U being recessed relative to the legs of the U so that the extended ends of the legs of said U lie below the bight of the U and project further from said carriage than does the bight of the U; and an inverted U-shaped hook member pivotally mounted on said extended ends of the legs of said U-shaped bracket with the legs of the U-shaped hook positioned between the legs of the U-shaped bracket, said U-shaped hook member being pivotable between a folded, inoperative position and an extended, operative position, the bight of said U-shaped hook member being recessed to permit of edgewise planar alignment of the bights of both of said U-shaped bracket and U-shaped hook in the same plane when the hook member is in its operative position, the bight of the U-shaped hook being positioned to engage the edge of the bight of the U-shaped bracket when the U-shaped hook is pivoted to its inoperative position, and edge portions of the legs of the U-shaped hook engaging the carriage and the underside of the bight of the U-shaped bracket when the hook member is in operative position.

References Cited in the file of this patent
UNITED STATES PATENTS

| 2,637,523 | Lucker | May 5, 1953 |
| 2,706,049 | Andrews | Apr. 12, 1955 |
| 2,755,065 | Nilson | July 17, 1956 |

FOREIGN PATENTS

| 8,123 | Great Britain | Apr. 20, 1901 |
| 787,404 | Great Britain | Dec. 11, 1957 |